(No Model.)

H. W. LIBBEY.
SEWER PIPE.

No. 463,281. Patented Nov. 17, 1891.

Witnesses.
J. George Seltzer
Charlotte Planta

Inventor.
Hosea W. Libbey
by Edwin Planta
Attorney.

UNITED STATES PATENT OFFICE.

HOSEA W. LIBBEY, OF BOSTON, MASSACHUSETTS.

SEWER-PIPE.

SPECIFICATION forming part of Letters Patent No. 463,281, dated November 17, 1891.

Application filed July 26, 1889. Serial No. 318,741. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Sewer-Pipes, of which the following, taken in connection with the accompanying drawings, is a specification.

The object of my invention is to produce a sectional drain-pipe, to which access can readily be had to the inside of the pipe for removing obstructions, or for other purposes, without breaking or removing the pipes, and also to produce a more perfect joint than with pipes of ordinary construction.

The invention consists in constructing the pipe in two sections, the lower one being of greater depth than the upper one, and also in constructing the plain end of the pipes with a rim or collar for making a perfect joint, as hereinafter fully described, and pointed out in the claims.

Figure 1:
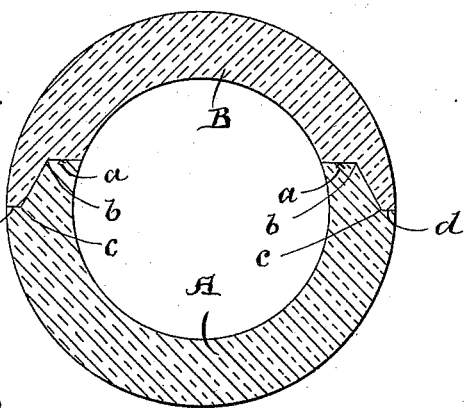
Figure 2:
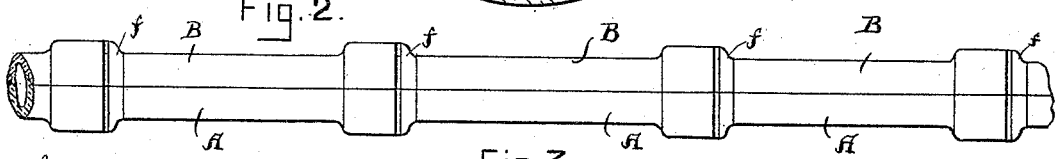
Figure 3:
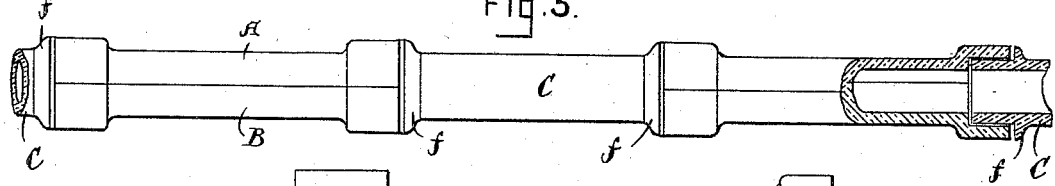
Figure 4:
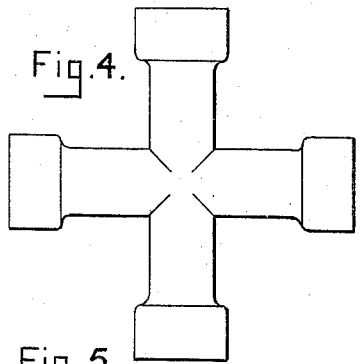
Figure 5:
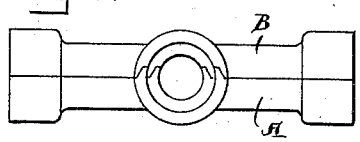
Figure 10:
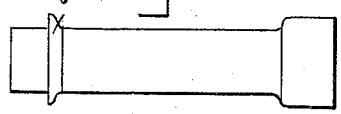
Figure 6:
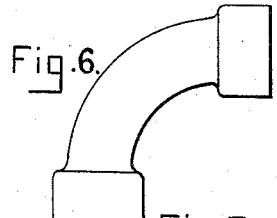
Figure 7:
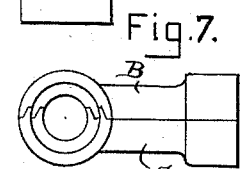
Figure 8:
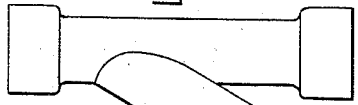
Figure 9:
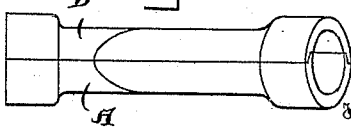

Referring to the accompanying drawings, Figure 1 represents a cross-section of a drain-pipe embodying my invention. Fig. 2 is a side view of several pipes connected together, as when laid. Fig. 3 is a view, partly in section, of pipes with a socket at each end, laid with intermediate plain round pipes with a collar at each end. Figs. 4 and 5 are respectively plan and side views of a cross-piece. Figs. 6 and 7 are respectively plan and side views of an elbow. Figs. 8 and 9 are respectively plan and side views of a branch pipe. Fig. 10 is a view of an ordinary drain-pipe having a rim or collar embodying my invention.

In constructing drain-pipes according to my invention the lower portion A is somewhat deeper than the upper portion B, preferably about two-thirds of the internal diameter of the pipe. The upper edge $a$ of the lower portion is flat horizontally for about one-half the thickness of the pipe, and from the point $b$ it slopes down outwardly to the point $c$ and thence out straight horizontally to the side of the pipe. I prefer to have the lower portion D on a line with the center of the pipe. The upper portion B is made to correspond and fit over the lower portion A, as shown. By making the joint inclined from the points $b$ to $c$ and locating the inner or upper part of the joint above the center of the pipe, several very important objects are accomplished—that is, the sections are more readily united or separated by reason of the inclined portion, and a closer joint is made than could be done with vertical walls. The bases of the overlapping portions can be made wider and the upper edge $a$ can also be made wider, owing to the contraction or drawing in of the inner surface of the edge of the section above the center line. As the inner surface of the pipe should be as smooth as possible, the increasing of the area of the inner portion of the edge prevents the liability of breakage, and consequently adds that much to the utility of the pipe. The same is true whether the joint be vertical or inclined, and the deepening of the lower section raises the joint that much above the bottom of the pipe, and necessitates the filling of the pipe that much fuller to reach the joint.

The pipes may be made with a socket at one end only and the straight end of each pipe be provided with a rim or collar $f$, as shown in Fig. 2, so that when the pipes are connected together by cement it is compressed between the end of the socket and the collar $f$ of the two adjacent pipes, thus making a perfect joint, and in this case the drain is composed entirely of sectional pipes; but I prefer to make the sectional pipes with a socket at each end, as shown in Fig. 3, in which the drain is composed of sectional pipes and plain round pipes C with a rim or collar $f$ at each end laid alternately, as shown. By this means access may be had to the interior of the drain at short intervals. It will be seen that by this construction of drain-pipes, access to the inside of the drain can readily be had by the removal of the upper portion of any of the sectional pipes and that without breaking the pipes, thus reducing the expense both in time and material, and by means of the collars the joint between the pipes is readily made, as the cement has only to be laid upon the straight end of the pipe, which is then inserted into the socket, thus preventing the necessity of building around the joints, as with pipes of ordinary construction.

My improved collar may be formed upon drain-pipes of ordinary construction, as shown in Fig. 10, thereby rendering it much easier to joint the pipes.

What I claim as my invention is—

1. A drain-pipe composed of longitudinally-separable sections, the joint at the inside being above the center of the pipe, substantially as described.

2. A drain-pipe composed of longitudinally-separable sections, the joint upon the inside being above the center of the pipe, whereby the edges of the lower section are contracted or drawn inward, the upper edges of the lower section having two horizontal portions and an outwardly and downwardly slanting portion connecting the horizontal portions, the upper section being made to correspond with and fit the lower portion, substantially as described.

3. A conduit composed of solid or continuous sections and separable sections, the continuous sections each having a socket at one end and a rim or collar at the other end, and the separable sections each having a socket formed at one end and having the opposite end adapted to fit within the end of the continuous section, substantially as described.

In testimony whereof I have signed my name to this specification, in the presence of two subscribing witnesses, on this 27th day of June, A. D. 1889.

HOSEA W. LIBBEY.

Witnesses:
CHAS. STEERE,
EDWIN PLANTA.